(12) United States Patent
Yaginuma

(10) Patent No.: US 11,859,656 B2
(45) Date of Patent: Jan. 2, 2024

(54) LINEAR DRIVING FORCE CONVERTING MECHANISM

(71) Applicant: NIDEC COPAL CORPORATION, Tokyo (JP)

(72) Inventor: Daisuke Yaginuma, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 185 days.

(21) Appl. No.: 17/200,162

(22) Filed: Mar. 12, 2021

(65) Prior Publication Data
US 2021/0293269 A1 Sep. 23, 2021

(30) Foreign Application Priority Data
Mar. 18, 2020 (JP) .................. 2020-048301

(51) Int. Cl.
| | |
|---|---|
| G06F 1/16 | (2006.01) |
| F16C 11/04 | (2006.01) |
| A45C 3/02 | (2006.01) |
| A45C 3/06 | (2006.01) |
| A45C 13/00 | (2006.01) |
| E05D 3/12 | (2006.01) |

(52) U.S. Cl.
CPC ............... *F16C 11/04* (2013.01); *A45C 3/02* (2013.01); *A45C 3/06* (2013.01); *A45C 13/005* (2013.01); *G06F 1/1681* (2013.01); *E05D 3/12* (2013.01); *E05Y 2900/602* (2013.01); *E05Y 2900/606* (2013.01)

(58) Field of Classification Search
CPC .............................. G06F 1/1681; G06F 1/1652
See application file for complete search history.

(56) References Cited

U.S. PATENT DOCUMENTS

| | | | | |
|---|---|---|---|---|
| 6,492,974 | B1 * | 12/2002 | Nobuchi | G06F 1/1618 345/173 |
| 11,016,529 | B1 * | 5/2021 | Tucker | G06F 1/1647 |
| 2017/0006725 | A1 * | 1/2017 | Ahn | H10K 59/87 |
| 2019/0301215 | A1 * | 10/2019 | Siddiqui | E05D 3/18 |
| 2021/0004055 | A1 * | 1/2021 | Chueh | G06F 1/1624 |
| 2021/0250432 | A1 * | 8/2021 | Lim | H04M 1/0277 |
| 2021/0286408 | A1 * | 9/2021 | Chueh | G06F 1/1652 |

(Continued)

FOREIGN PATENT DOCUMENTS

| | | |
|---|---|---|
| JP | 54-23979 U | 2/1979 |
| JP | 2014-85734 A | 5/2014 |

(Continued)

*Primary Examiner* — Anthony Q Edwards
(74) *Attorney, Agent, or Firm* — HAUPTMAN HAM, LLP

(57) ABSTRACT

A thrust converting mechanism has a shaft provided with a pair of helical mated portions, formed in mutually opposing directions; a pair of linear motion members having mating portions for engaging, respectively, the pair of mated portions; a case for supporting the pair of linear motion members so as to enable movement along the shaft, and for bearing the shaft rotatably; a rocking member that is borne on one of the linear motion members of the pair, and for engaging with the other linear motion member of the pair, and for rocking through relative motion of the shaft in respect to the case; and a moving member, supported on the case, that engages with the rocking member to move, through rocking of the rocking member, in a direction that crosses the shaft.

8 Claims, 15 Drawing Sheets

(56) References Cited

U.S. PATENT DOCUMENTS

| | | | | |
|---|---|---|---|---|
| 2023/0105988 A1* | 4/2023 | Yang | ................ | H04M 1/022 361/660 |
| 2023/0126247 A1* | 4/2023 | Yoon | ................ | G06F 1/1698 361/679.27 |
| 2023/0129418 A1* | 4/2023 | Pai | ................ | F16C 11/04 361/679.27 |

FOREIGN PATENT DOCUMENTS

| | | |
|---|---|---|
| JP | 5776010 B2 | 7/2015 |
| JP | 2015-158216 A | 9/2015 |
| JP | 2018-50194 A | 3/2018 |
| JP | 2019-19829 A | 2/2019 |

* cited by examiner

LINEAR DRIVING FORCE CONVERTING MECHANISM

CROSS REFERENCE TO RELATED APPLICATION

The present application claims priority of Japanese Patent Application No. 2020-048301 filed Mar. 18, 2020. The entire contents of which are hereby incorporated by reference.

FIELD OF TECHNOLOGY

The present invention relates to a converting mechanism for a linear driving force.

BACKGROUND

Conventionally, there are known motion direction converting mechanisms for converting rotational motion into linear motion through a threaded shaft wherein threads are formed on the outer peripheral portion thereof and a nut that screws together with the threaded shaft (see, Japanese Unexamined Utility Model Registration Application Publication S54-23979).

In such a mechanism, if the rotation of the threaded shaft is limited to a prescribed angle range, it is necessary to set the screw lead to be large, in order to increase the amount of movement of the nut. However, when the screw lead is large, the load when the nut is undergoing linear travel will be large, necessitating a large driving force in rotating the threaded shaft. Moreover, according to the prior art described above, the direction of movement of the nut is limited to a linear direction along the screw shaft, so there is a problem in that applications for this mechanism are limited.

On the other hand, typically hinge mechanisms, or the like, are used as mechanisms for bearing revolution of a case around a shaft. In particular, notebook-style PCs and mobile information terminals, and the like, typically use a configuration wherein a case in which a display is installed and a case for housing an operating portion are folded together. Additionally, developments are also underway wherein displays are mounted in two cases that are joined together by the hinge mechanism, to produce a display with a wide screen in a state wherein the two cases are opened widely.

In such a bearing mechanism, the end portions of the two cases are supported, so that when one case is pivoted in a range between 180° and 360° in respect to the other case, the thickness of the cases causes the end portions thereof to interfere with each other, producing a problem in that the angle of pivoting is limited. If, in order to avoid this, the bearing portion is provided at a position that is away from the end portion of the case, then there will be a gap between the end portions of the cases when in the state wherein the two cases are opened flat, and when used as a wide screen that bridges the displays that are provided in each of the two cases, this produces a shortcoming in terms of continuity of the screen.

SUMMARY OF THE INVENTION

The present invention is proposed in order to handle such a problem. That is, the object is to enable an increase in the amount of linear motion, with respect to a limited shaft rotation, without an increase in the driving force for rotation around the shaft, and to prevent the production of a gap when two cases are opened wide, while eliminating the interference between the end portions between the two cases when the bearing mechanism is structured.

In order to solve such a problem, the present invention is provided with the following structures:

A thrust converting mechanism, having a shaft provided with a pair of helical mated portions, formed in mutually opposing directions; a pair of linear motion members having mating portions for engaging, respectively, the pair of mated portions; a case for supporting the pair of linear motion members so as to enable movement along the shaft, and for bearing the shaft rotatably; a rocking member that is borne on one of the linear motion members of the pair, and for engaging with the other linear motion member of the pair, and for rocking through relative motion of the shaft in respect to the case; and a moving member that engages with the rocking member to move, through rocking of the rocking member, in a direction that crosses the shaft.

BRIEF DESCRIPTIONS OF THE DRAWINGS

DETAILED DESCRIPTION

An embodiment according to the present invention will be explained below in reference to the drawings. In the explanation below, identical reference symbols in different drawings indicate parts with identical functions, and redundant explanations will be omitted as appropriate in each of the drawings.

Figure 1:
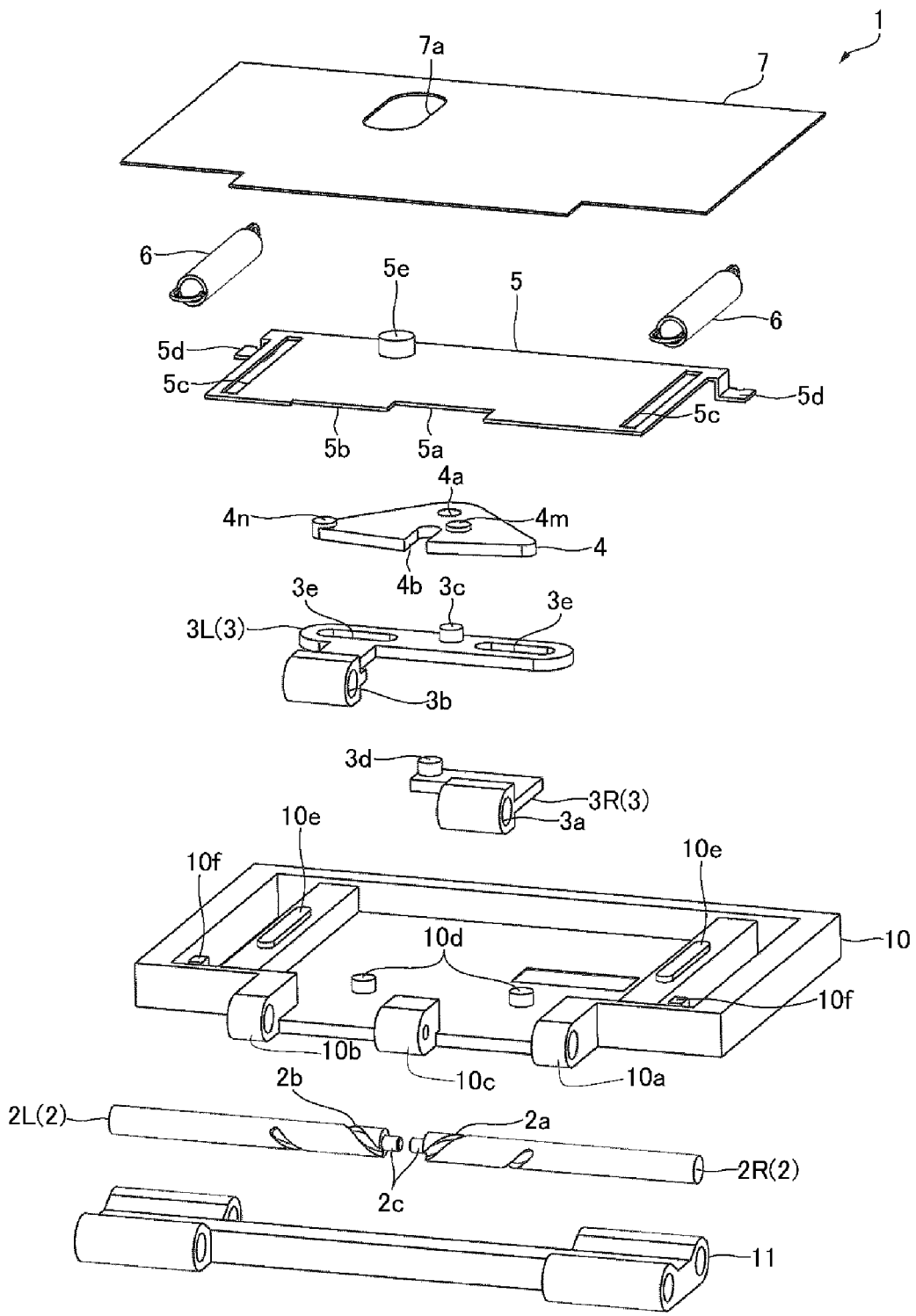
FIG. 1 is an exploded perspective diagram of a thrust converting mechanism according to an embodiment according to the present invention.

As illustrated in FIG. 1, the thrust converting mechanism 1 comprises, at least, shafts 2 (2R and 2L), linear motion members 3 (3R and 3L), a case 10, a rocking member 4, and a moving member 5. The thrust converting mechanism can also be considered a mechanism to convert a linear driving force.

The shaft 2 here is equipped with split shafts 2R and 2L that are equipped facing each other linearly, but it may instead be a single shaft 2 that spans these. Helical mated portions 2a and 2b are formed on the shaft 2, with the helical directions thereof formed in mutually opposite directions. The mated portions 2a and 2b may be formed through male threads or female threads, or may be formed through a helical cam groove or cam protrusion, as illustrated. The shaft 2 is held, on one end side thereof, by a holding member 11, in the example in the figure.

The linear motion member 3 comprises a left-right pair of linear motion members 3R and 3L, where the linear motion member 3R comprises a mating portion 3a that engages with a mated portion 2a, and the linear motion member 3L comprises a mating portion 3b that engages with a mated portion 2b. The mating portions 3a and 3b are nuts, for the case of the mated portions 2a and 2b being screws, or, for example, in the case of the mated portions 2a and 2b being cam grooves, are mating protrusions, or the like, that engaged therewith. The linear motion members 3 (3R and 3L) move linearly along the shaft 2 through the shaft 2 rotating relative thereto.

The rocking member 4 has an axle hole 4a for bearing a shaft protrusion 3c that is provided on one of the linear motion members 3L, and a mating portion 4b for engaging the mating protrusion 3d that is provided on the other linear motion member 3R, where the pair of linear motion members 3 (3R and 3L) revolves around the shaft protrusion 3c to become closer or more separated, along the shaft 2.

The moving member 5 has mating portions 5a and 5b that engage with mating protrusions 4m and 4n and that are provided on the rocking member 4. In the example in the figure, when the rocking member 4 rocks by revolving to the left around the shaft protrusion 3c, the mating protrusion 4m engages with the mating portion 5a, and when the rocking member 4 rocks by revolving to the right around the shaft protrusion 3c, the mating protrusion 4n engages with the mating portion 5b.

Through the engagement of the mating protrusions 4m and 4n with the mating portions 5a and 5b, when the rocking member 4 rocks around the shaft protrusion 3c, the moving member 5 moves in a direction that is perpendicular to the shaft 2. At this time, in the example in the figure, in the rocking member 4 the distance from the axle hole 4a to the mating protrusion 4m will be different from the distance from the axle hole 4a to the mating protrusion 4n, where the distance from the axle hole 4a to the mating protrusion 4n is longer than the distance from the axle hole 4a to the mating protrusion 4m, and because step differences are provided in the mating portions 5a and 5b in the moving member 5, the amount of movement of the moving member 5 will be greater in the case of the rocking member 4 rocking by revolving to the right than when the rocking member 4 rocks by revolving to the left.

The case 10 is borne on shaft 2. In the example in the figure, the case 10 has a bearing portion 10a that is borne on the split shaft 2R and a bearing portion 10b that is borne on the split shaft 2L, where the tip end protrusions 2c of the split shafts 2R and 2L are supported on the bearing portion 10c.

The case 10 supports the linear motion members 3 (3R and 3L) so as to support movement along the shaft 2, and supports indirectly the rocking member 4, which is supported on the linear motion members 3 (3R and 3L). In the example in the figure, an elongated hole 3e is provided along the shaft 2 on the linear motion member 3L, where a supporting protrusion 10d that is provided on the case 10 is inserted into the elongated hole 3e.

The case 10 supports the moving member 5 so as to enable movement in a direction that is perpendicular to the shaft 2. A guide hole 5c of an elongated hole along the direction of movement is provided in the moving member 5, and a guide protrusion 10e that is provided on the case 10 is inserted into this guide hole 5c.

A hook portion 5d is provided on the moving member 5, where a spring 6, which has one end thereof hooked on the hook portion 5d, has the other end thereof hooked on a hook portion 10f of the case 10. Through this, the moving member 5 is biased by the spring toward the shaft 2, in a state wherein it is supported on the case 10. Through this spring biasing, the mating portions 5a and 5b of the moving member 5 will always be in a state of engagement with one or both of the mating protrusions 4m and 4n of the rocking member 4. Moreover, a joining protrusion 5e, for joining with another component, is provided on the moving member 5. This joining protrusion 5e may be provided so as to pass through an opening 7a of a dividing plate 7 that is provided if necessary.

Figure 2:
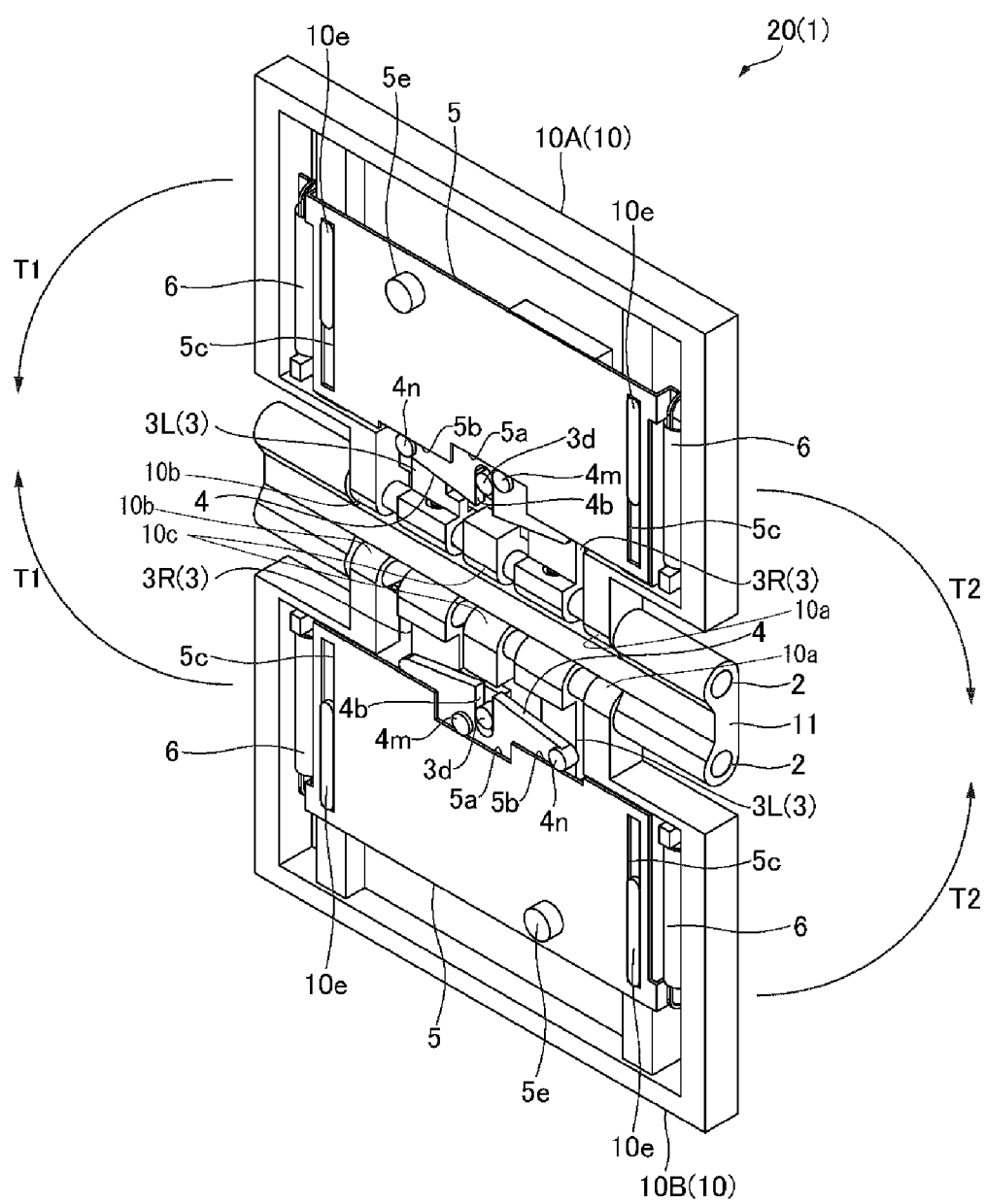
FIG. 2 is a perspective diagram depicting a hinge apparatus (opened state).
Figure 3:
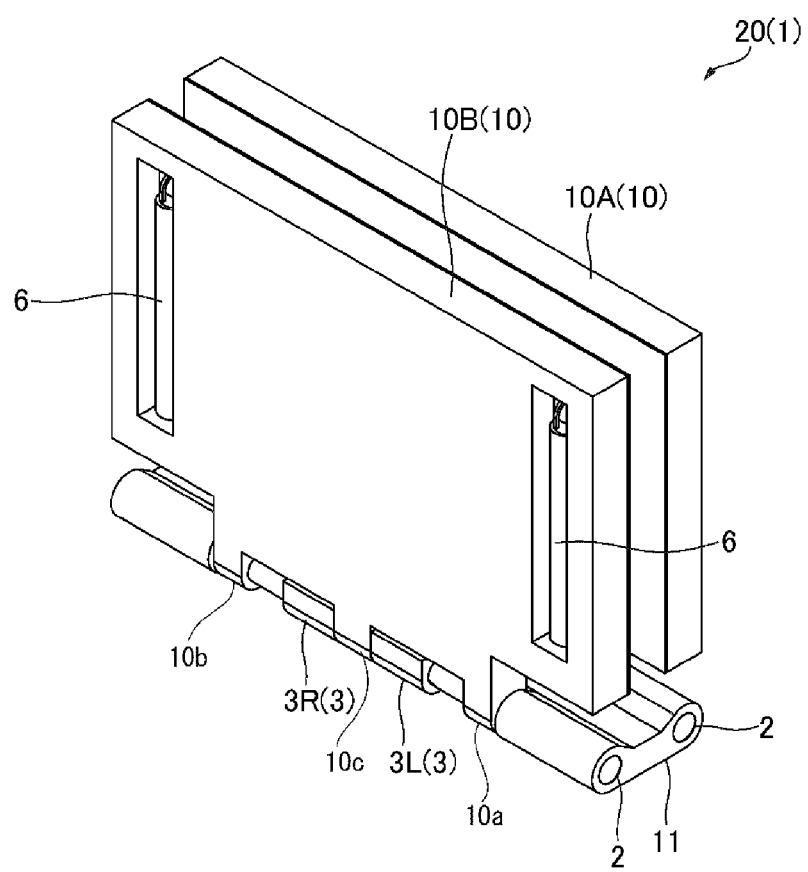
FIG. 3 is a perspective diagram depicting a hinge mechanism (folded to the inside).
Figure 4:
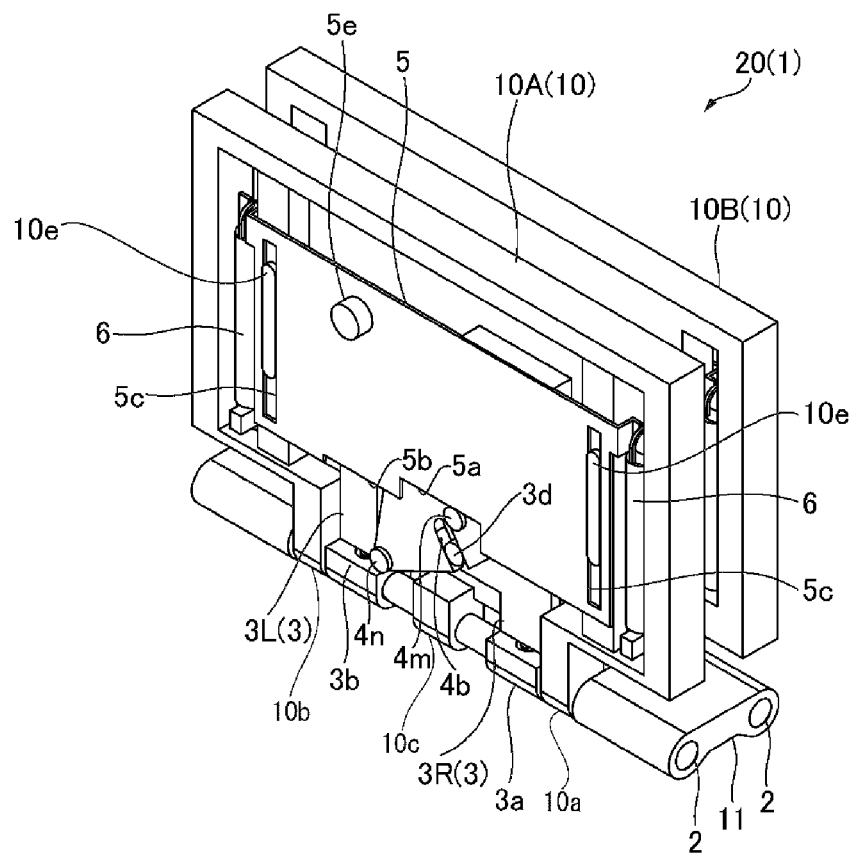
FIG. 4 is a perspective diagram depicting a hinge mechanism (folded to the outside).

In such a thrust converting mechanism 1, the two shafts 2 are held in parallel by a holding member 11, making it possible to produce the hinge apparatus 20 shown in FIG. 2 through FIG. 4. In the hinge apparatus 20, the two shafts 2, which each have mated portions 2a and 2b, are secured in a state wherein end portions thereof are held by the holding member 11, where the two shafts 2 that are secured are borne by the respective cases 10 (10A and 10B).

The hinge apparatus 20 enables the pair of cases 10 (10A and 10B) to be changed to a opened state, wherein they are positioned in a plane, as illustrated in FIG. 2, an inward state wherein they have been rotated in the direction of the arrow T1 from the state wherein they are positioned in a plane (referencing FIG. 3), and an outward folded state wherein they have been rotated in the direction of the arrow T2 from the state wherein they are positioned in a plane (referencing FIG. 4).

In such a hinge apparatus 20, the thrust that causes the linear motion members 3 (3R and 3L) to move along the shaft 2 is produced through rotation of the case 10 (10A or 10B) in respect to the shaft 2 that is secured to the holding member 11. That is, the rotational force of the operation for folding or unfolding the case 10 (10A and 10B) is converted, in the hinge apparatus 20, into linear thrust of the linear motion members 3 (3R and 3L).

At this time, the pair of linear motion members 3 (3R and 3L) will be in a neutral position in the opened state that is depicted in FIG. 2, or will be in a state wherein they are nearest to each other in the inwardly folded state that is depicted in FIG. 3, or a state wherein they are furthest apart from each other in the outwardly folded state that is depicted in FIG. 4. Here the relative rotation of the linear motion members 3 (3R and 3L), in respect to the shaft 2, is limited to a rotation of 360° from the inwardly folded state that is depicted in FIG. 3 to the outwardly folded state that is depicted in FIG. 4, but the mating portions 3$a$ and 3$b$ of the linear motion members 3, which engage with the pair of mated portions 2$a$ and 2$b$, have twice the amount of relative movement when compared to the movement of either alone.

Additionally, the movement of the linear motion members 3 (3R and 3L) along the shaft 2 is converted into a revolution of the rocking member 4, and further, the revolution of the rocking member 4 is converted into movement in the direction perpendicular to the shaft 2 in the moving member 5, thus making it possible to convert the direction of movement into a direction that is different from the direction along the shaft 2, while securing a large amount of movement in respect to the limited rotation of the shaft 2. This makes it possible to increase the scope of application of the hinge apparatus 20.

Figure 5:
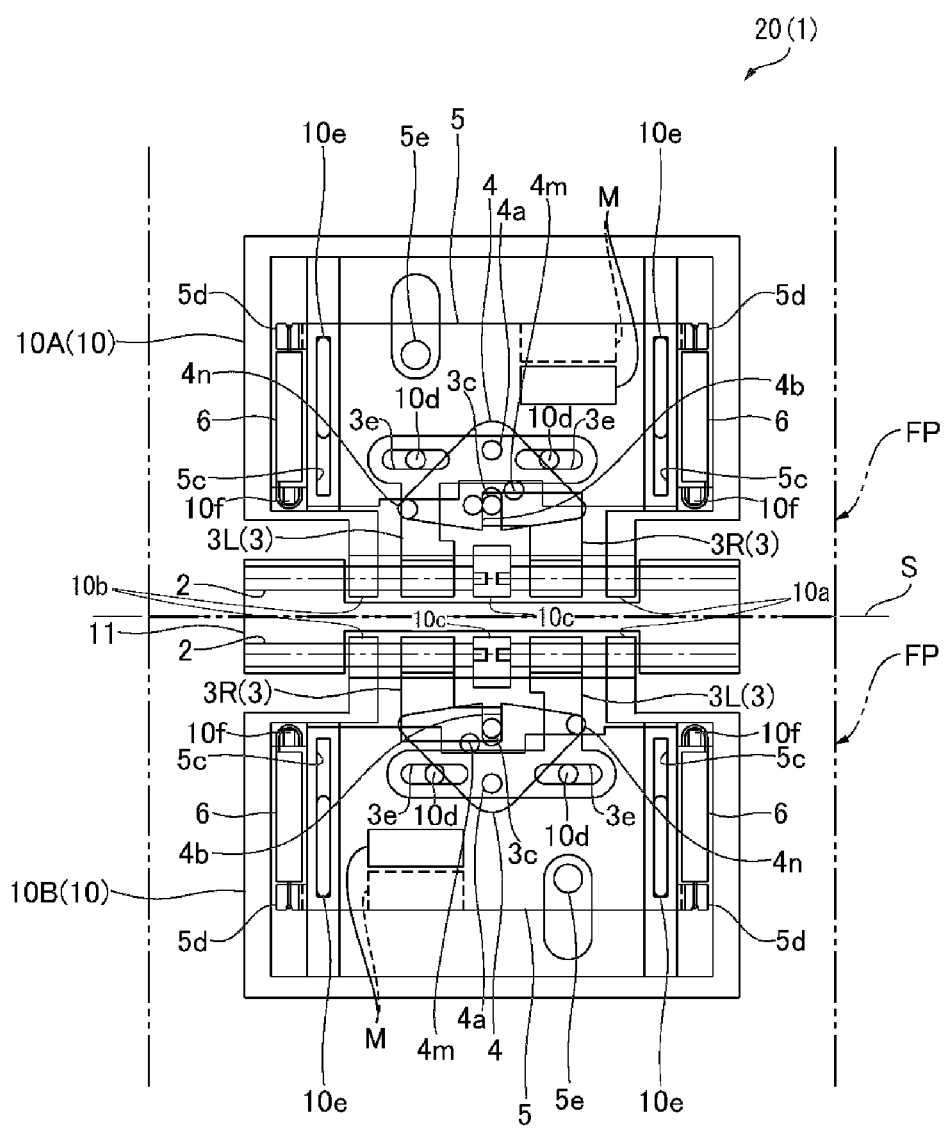
FIG. 5 is an example of operation of the hinge mechanism (opened state).
Figure 6:
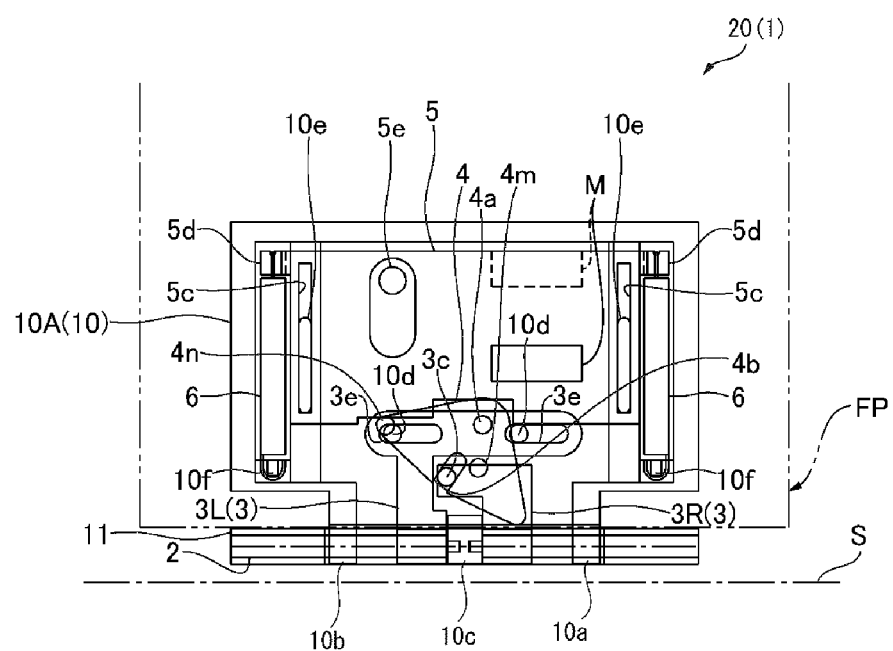
FIG. 6 is an example of operation of the hinge mechanism (folded to the inside).
Figure 7:
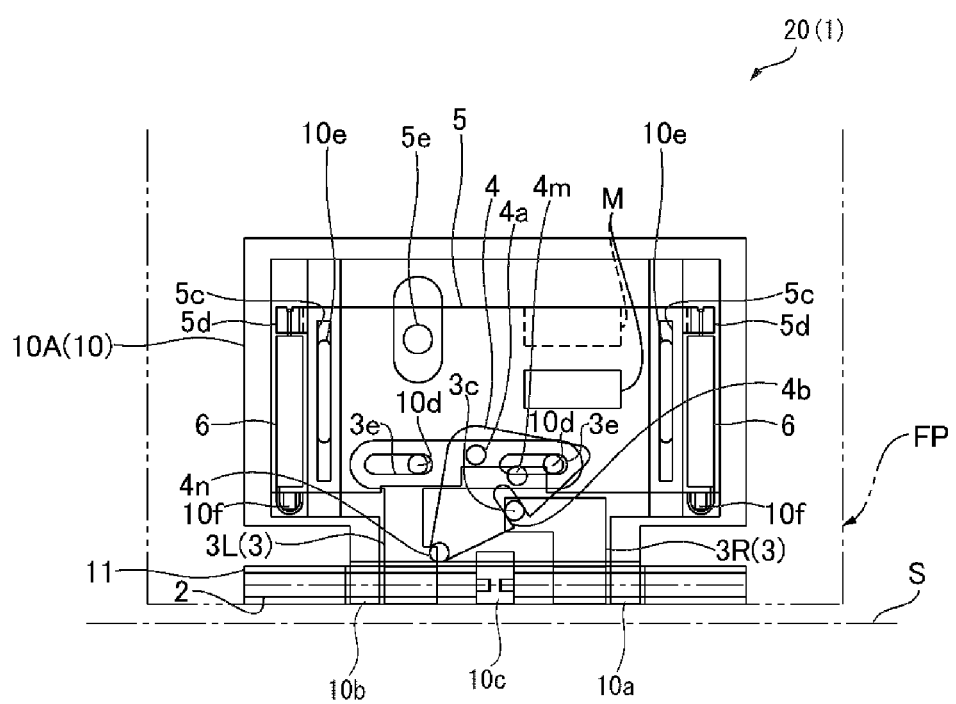
FIG. 7 is an example of operation of the hinge mechanism (folded to the outside).

FIG. 5 through FIG. 7 depict examples of operation when the hinge apparatus 20 is used in a mobile information terminal. In this case, when a folding operation is carried out through rotating the case 10 (10A and 10B) in respect to the shaft 2, through the hinge apparatus 20, a flat-panel display (hereinafter termed simply "display") FP, which is a flat panel member that is combined with the moving member 5, moves in a direction that is perpendicular to the shaft 2.

In the opened state in FIG. 5, the cases 10A and 10B are positioned in a plane, where the display FP that is combined with the moving members 5 will be in a state wherein the end portions, which faced each other across a junction portion S, will be mutually abutting, with no gap therebetween. The state of the hinge apparatus 20 at this time is that wherein the linear motion members 3 (3R and 3L) are in a neutral position in respect to the shaft 2, and the mating protrusions 4$m$ and 4$n$ and of the rocking member 4 are both engaged with the mating portions 5$a$ and 5$b$ of the moving member 5, and the moving member 5 is in a state that is nearest to the shaft 2.

In contrast, in the inwardly folded state, depicted in FIG. 6, the state of the hinge apparatus 20 is a state wherein the linear motion members 3 (3R and 3L) are nearest to each other along the shaft 2, where the rocking member 4 has revolved to the right around the shaft protrusion 3$c$ so that the mating protrusion 4$m$ of the rocking member 4 pushes the mating portion 5$b$ of the moving member 5 upward, so that the moving member 5 moves to a state that is away from the shaft 2. Through this, the display FP that is combined with the moving member 5 will be in a state wherein the end portion thereof is away from the junction portion S.

Moreover, in the outwardly folded state, depicted in FIG. 7, the state of the hinge apparatus 20 is a state wherein the linear motion members 3 (3R and 3L) are most separated from each other along the shaft 2, where the rocking member 4 has revolved around the shaft protrusion 3$c$ so that the mating protrusion 4$n$ of the rocking member 4 pushes the mating portion 5$a$ of the moving member 5 upward, so that the moving member 5 moves to a state that is away from the shaft 2. Through this, the display FP that is combined with the moving member 5 will be in a state wherein the end portion thereof is away from the junction portion S, but the end portion of the display FP will be closer to the junction portion S than the state depicted in FIG. 6.

Figure 8A:
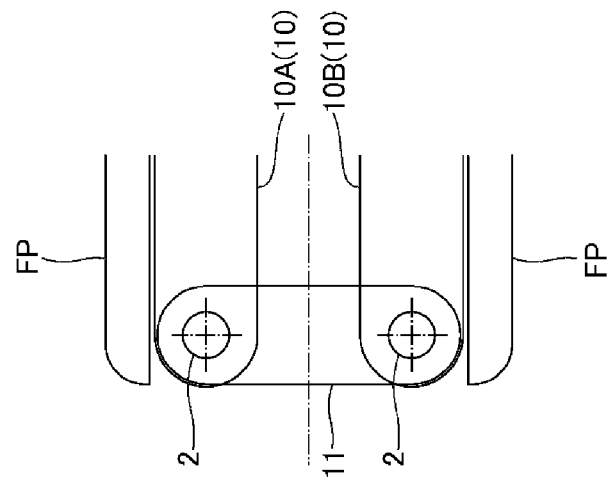
FIGS. 8a-8c are explanatory diagrams for a hinge apparatus on which a flat-panel display is provided (wherein FIG. 8a is the opened state, FIG. 8b is the state that is folded to the inside, and FIG. 8c is the state that is folded to the outside).
Figure 8B:
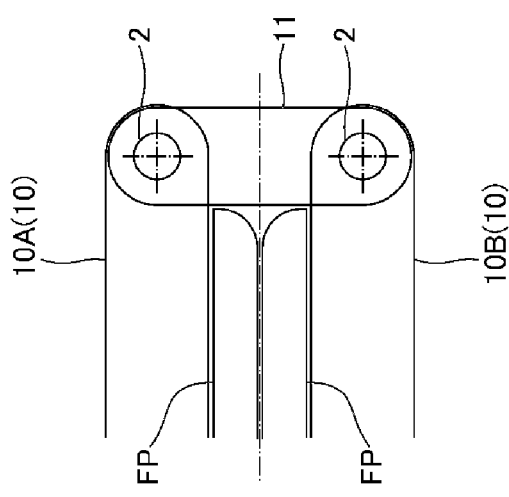
Figure 8C:
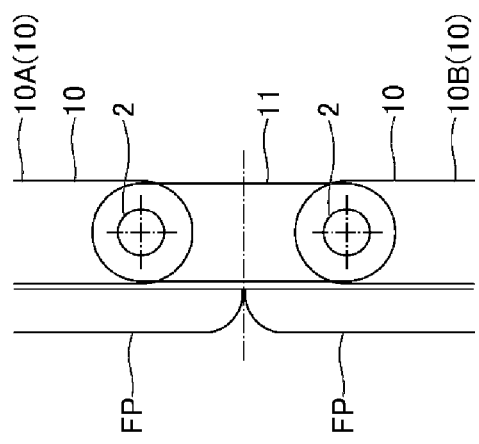

Through this hinge apparatus 20, in the opened state of the cases 10 (10A and 10B), the state will be one wherein the end portions of the pair of displays FP are abutting each other without a gap, as depicted in FIG. 8$a$. Additionally, in the inwardly folded state of the cases 10 (10A and 10B), the state will be one wherein the pair of displays FP are enclosed on the inside of the holding member 11, as depicted in FIG. 8$b$. Additionally, in the outwardly folded state of the cases 10 (10A and 10B), the state will be one wherein the pair of displays FP is disposed in a position wherein they are covered by the holding member 11, and do not protrude from the holding member 11, as depicted in FIG. 8$c$.

In the hinge apparatus 20 the shafts 2 that bear the respective cases 10A and 10B are separated from each other, and thus when the pair of cases 10 (10A and 10B) are rotated to the opened state or the folded state, 180° rotation of the cases 10 (10A and 10B) around the shaft 2 is possible without the end portions of the cases 10 (10A and 10B) interfering with each other.

Moreover, magnets M are attached to each of the cases 10 (10A and 10B) and the moving members 5 in the hinge apparatus 20. The magnets M that are attached to both are at positions that are adjacent in the cases 10 (10A and 10B) in the opened state, and which move away from each other in the state wherein the cases 10 (10A and 10B) are folded. When the magnets M that are attached to both attract each other, the cases 10 (10A and 10B) are held in the opened state by the attractive force, and when the magnets M that are attached to both repel each other, the folded state is maintained by the repulsive force.

FIG. 9 through FIG. 12 depict examples of operation of the thrust converting mechanism 1 through a briefcase handle H. The term "briefcase" is used generically for any handle of a bag for a briefcase, purse, etc. The one illustrated example is similar to that of a briefcase, but one of ordinary skill can contemplate other handle examples.

In this briefcase, the handle H is provided rotatably on a hinge portion J that is provided in a briefcase main unit K, where the shaft 2 of the thrust converting mechanism 1 is rotated through rotation of the handle H.

Figure 10A:
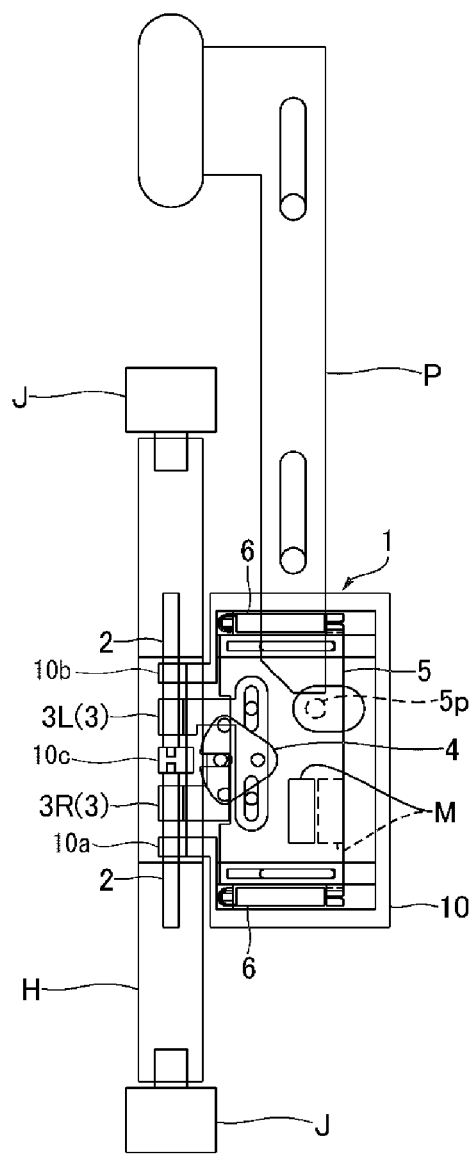
FIG. 10a is operation explanatory diagrams for a hinge apparatus equipped with a handle (similar to that of a briefcase, purse, or the like) and is the operating state of the thrust converting mechanism.
Figure 10B:
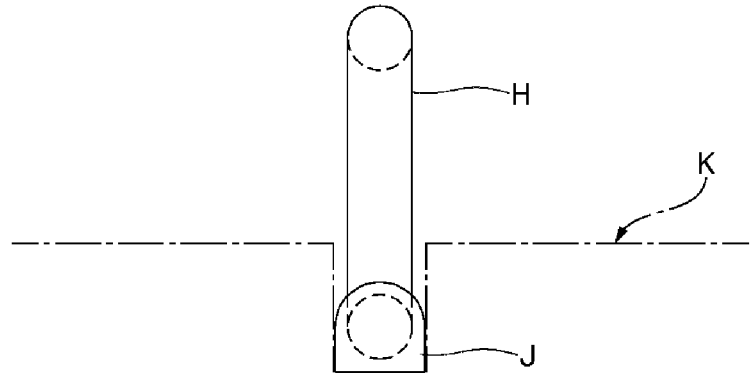
FIG. 10b is operation explanatory diagrams for a hinge apparatus equipped with a handle and is the operating state of the handle.
Figure 11A:
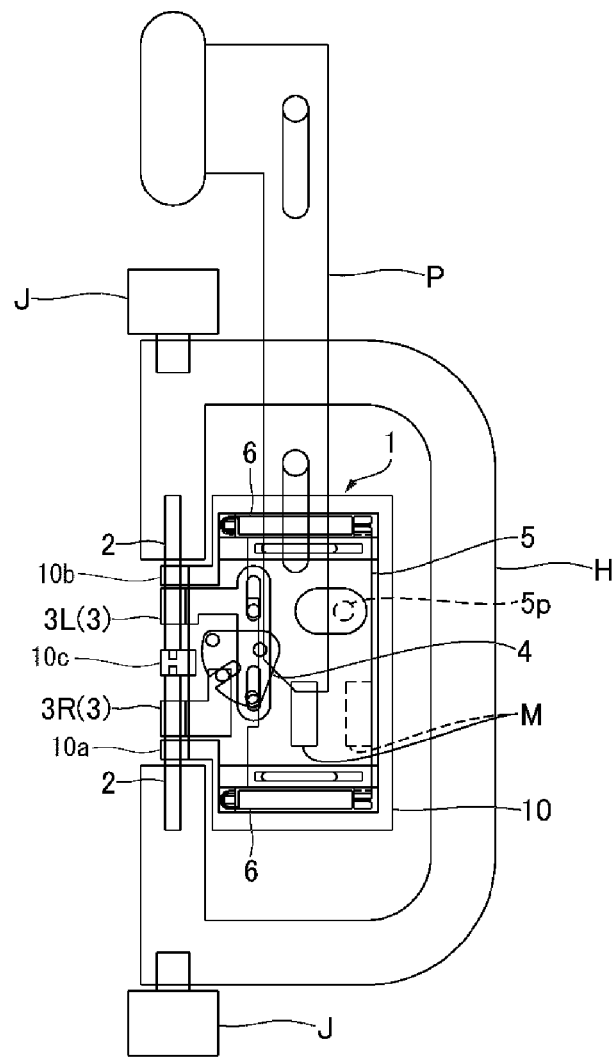
FIG. 11a is operation explanatory diagrams for a hinge apparatus equipped with a handle (similar to that of a briefcase, purse, or the like) and is the operating state of the thrust converting mechanism.
Figure 11B:
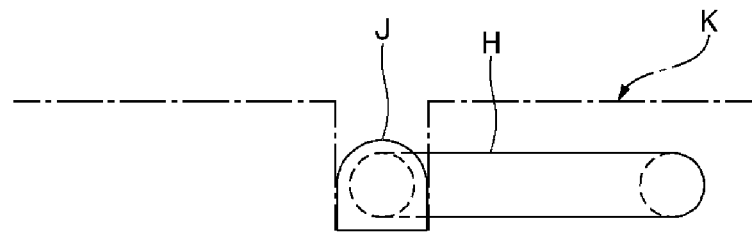
FIG. 11b is operation explanatory diagrams for a hinge apparatus equipped with a handle and is the operating state of the handle.
Figure 12A:
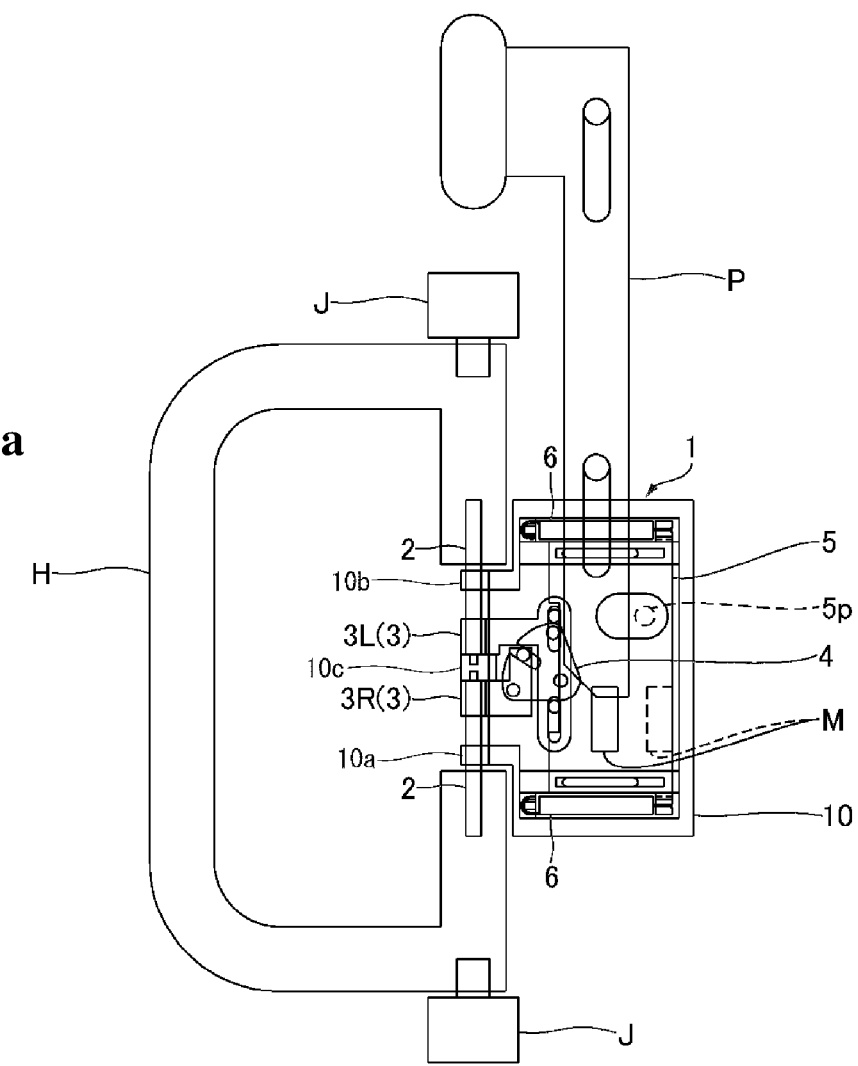
FIG. 12a is operation explanatory diagrams for a hinge apparatus equipped with a handle (similar to that of a briefcase, purse, or the like) and is the operating state of the thrust converting mechanism.
Figure 12B:
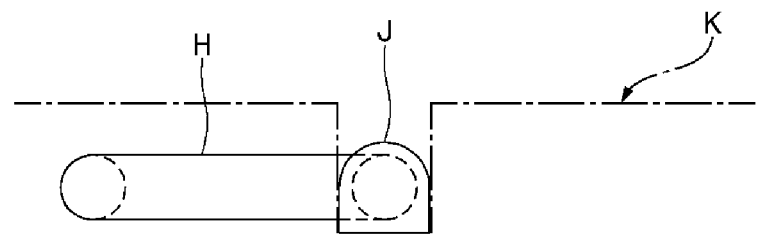
FIG. 12b is operation explanatory diagrams for a hinge apparatus equipped with a handle (similar to that of a briefcase, purse, or the like) and is the operating state of the thrust converting mechanism and is the operating state of the handle).

In such a briefcase, when the handle H is grasped, the handle H goes into the 90° standing state, as depicted in FIG. 10$b$, and when the handle H is released, the handle H goes into a state wherein it is laying down, at 0° or 180°, as depicted in FIG. 11$b$ or FIG. 12$b$. At this time, when the handle H is rotated from 0° to 180° in respect to the briefcase main unit K, the shaft 2 rotates relatively from 0° to 180° in respect to the frame 10 that is secured to the briefcase main unit K.

Figure 9:
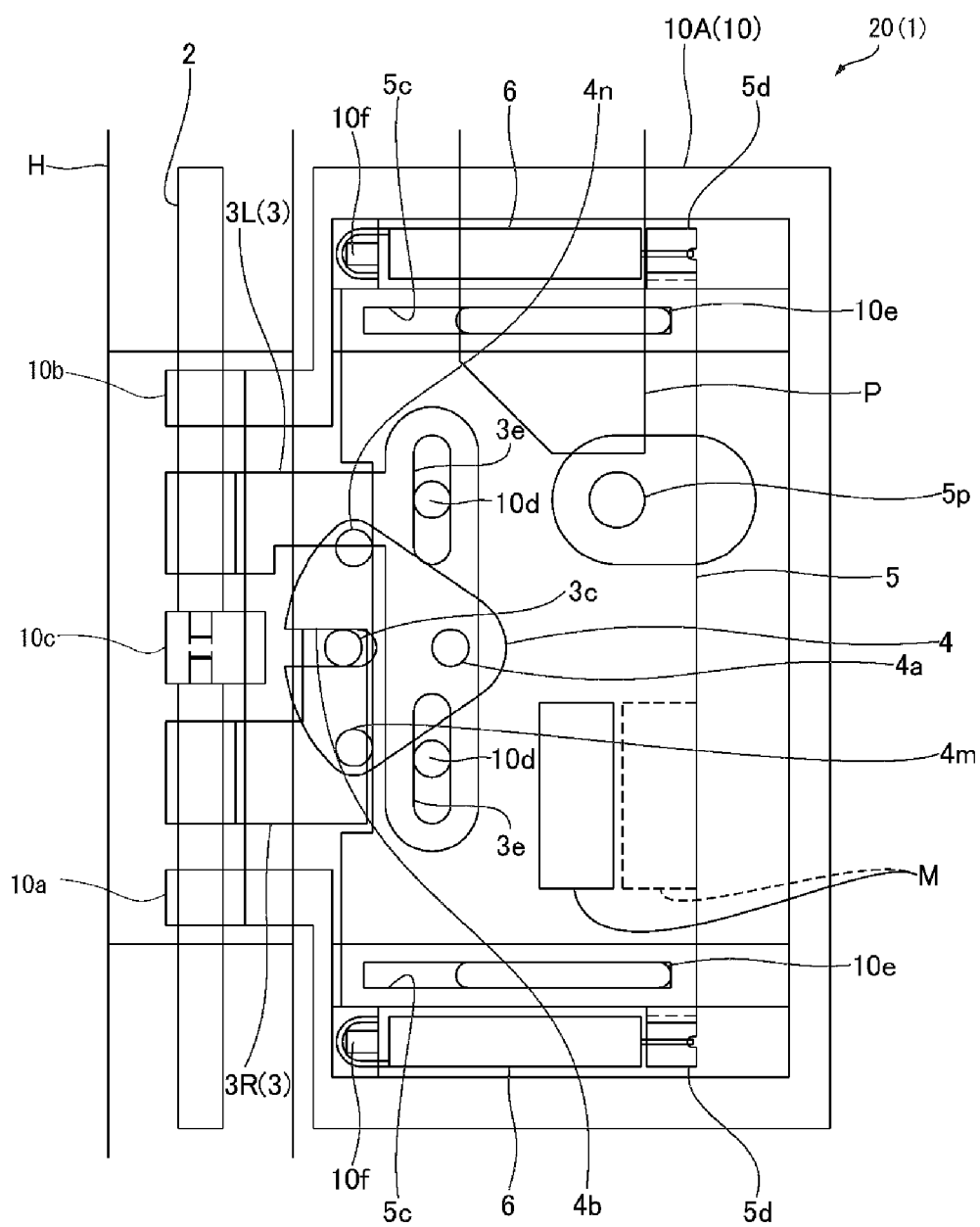
FIG. 9 is an enlarged view of critical portions of a hinge apparatus equipped with a handle (similar to that of a briefcase, purse, or the like).

The thrust converting mechanism 1 comprises the features described above, as illustrated in FIG. 9, and thus at this time, in the state wherein the handle H is standing at 90°, the linear motion members 3 (3R and 3L) will be in the neutral position, as depicted in FIG. 10a, and the moving member 5 will move to a state that is nearest to the shaft 2, and in the state wherein the handle H is laying over at 0° or 180°, the linear motion members 3 (3R and 3L) will move to the state wherein they are furthest apart from each other or the state wherein they are nearest to each other, and the moving member 5 will move to a state wherein it is furthest from the shaft 2, as depicted in FIG. 11a or FIG. 12a. In the examples depicted in FIG. 9 through FIG. 12, the mating protrusions 4m and 4n of the rocking member 4 are provided at equal distances from the axle hole 4a.

In a briefcase that is provided with such a handle H, the locking mechanism of the briefcase can be actuated, or the like, linked to the movement of the moving member 5 in the thrust converting mechanism 1. For example, when the handle H is in the 90° standing state, as illustrated in FIG. 9, inward motion of the lock releasing lever P is prevented by the protrusion 5P that is provided on the moving member 5, and when the handle H goes into the state that is laying down at 0° or 180°, the movement of the protrusion 5P in the moving member 5 allows inward motion of the lock releasing lever P.

This can eliminate problems with the briefcase coming open through the lock being released through unintentional inward motion of the lock releasing lever P, in the state wherein the handle H is standing at 90°, that is, the state wherein the handle H is grasped. Moreover, in a state wherein the handle H is laying down at 0° or 180°, that is, a state wherein the handle H has been released, it is possible to open the briefcase quickly, because the lock releasing lever P can be moved in without performing another operation.

Note that in the example in the figure, in the thrust converting mechanism 1, magnets M are provided on the case 10 and the moving member 5, where the repulsive force between the magnets M produce a state wherein the handle H lies down at 0° or 180° when the handle H is released. This can eliminate a state wherein the lock releasing lever P is unable to move in, which would be caused by the handle H remaining in the standing state despite the handle H being released.

While in the two embodiments described above, the "direction perpendicular to the shaft 2" was illustrated as directions crossing the direction in which the shaft 2 extends, it may be another direction instead. For example, in another embodiment the "direction crossing the shaft 2" may cross, at an angle other than 90°, the direction in which the shaft 2 extends.

FIG. 13 through FIG. 18 depict a thrust converting mechanism 1A according to another embodiment and a hinge apparatus 21 provided therewith. The thrust converting mechanism 1A, as with the example described above, comprises at least shafts 2 (2R and 2L), linear motion members 3 (3R and 3L), cases 10, and a rocking member 4, and a moving member 5.

Figure 13A:
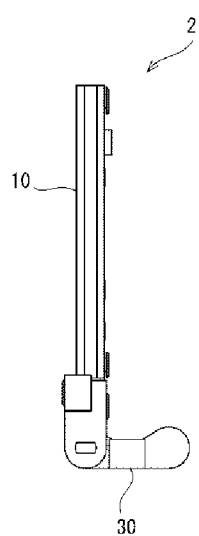
FIG. 13a is an explanatory diagram depicting another embodiment of a hinge apparatus comprising a thrust converting mechanism where the case angle is 90° and is a side view.
Figure 14A:
FIG. 14a is an explanatory diagram wherein the case angle in the embodiment shown in FIG. 13 is opened to 180° and is a side view.
Figure 14B:
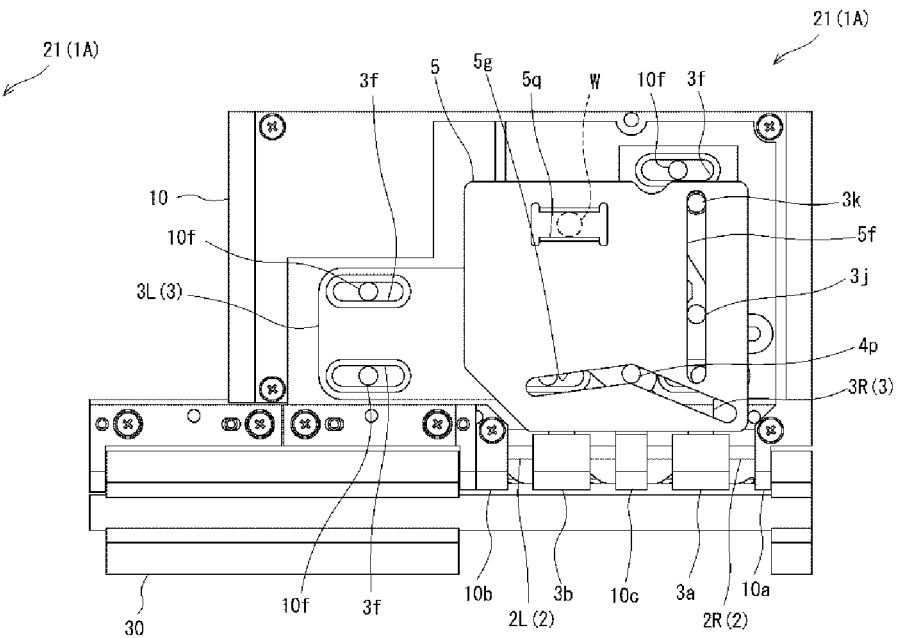
FIG. 14b is an explanatory diagram wherein the case angle in the embodiment shown in FIG. 13 is opened to 180° and is a front view.
Figure 15A:
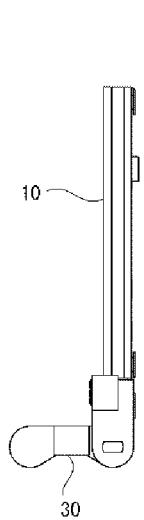
FIG. 15a is an explanatory diagram wherein the case angle in the embodiment shown in FIG. 13 is opened to 270° and is a side view.

The case 10 supports the shaft 2, rotatably, by the bearing portions 10a and 10b, and the tip end portions of shafts 2R and 2L are supported by the bearing portion 10c. Moreover, the case 10 is hinged together by a hinge frame 30, and can be rotated to a case angle of 90°, as depicted in FIG. 13a, a case angle of 180°, as depicted in FIG. 14a, or a case angle of 270°, as depicted in FIG. 15a, in respect to the hinge frame 30.

As with the case 10, hinge frames 30 can be attached with axial symmetry, and when a pair of cases 10 is hinged on the hinge frame 30, each case 10 is supported so as to enable rotation of 180° in respect to the hinge frame 30.

The shafts 2 (2R and 2L) are connected in respect to the hinge frame 30, and when the case 10 rotates in respect to the hinge frame 30, the shaft 2 rotates relative to the case 10.

Similarly to the example described above, in the thrust converting mechanism 1A, when the shaft 2 rotates relative to the case 10, the linear motion members 3 (3R and 3L) that are engaged with the shaft 2 will move linearly along the shaft 2.

Figure 13B:
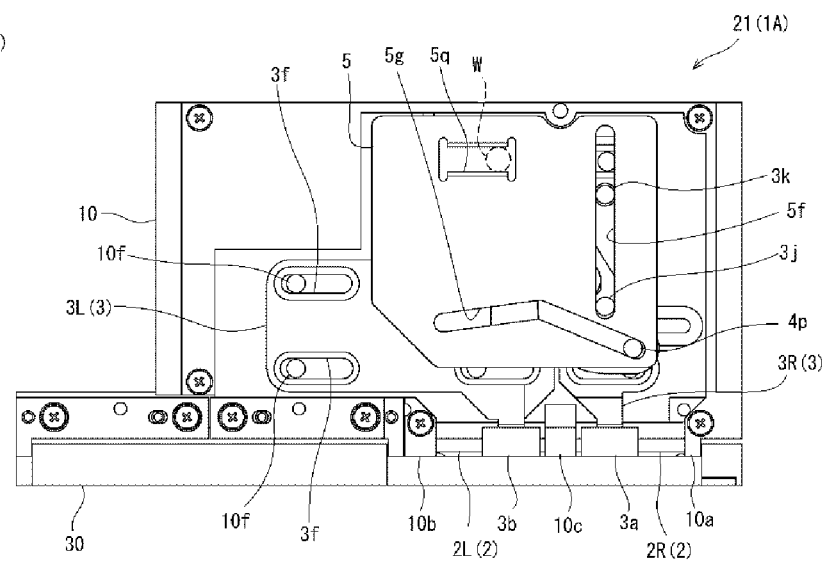
FIG. 13b is an explanatory diagram depicting another embodiment of a hinge apparatus comprising a thrust converting mechanism where the case angle is 90° and is a front view.
Figure 15B:
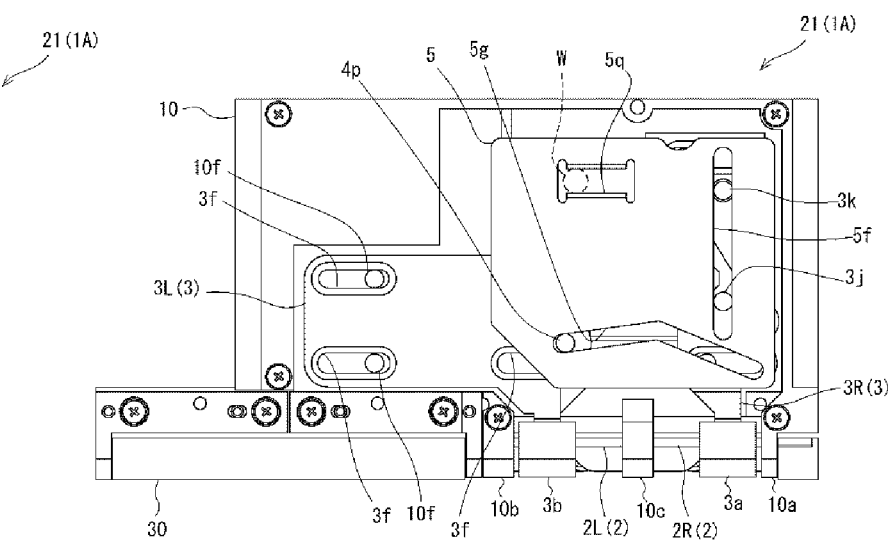
FIG. 15b is an explanatory diagram wherein the case angle in the embodiment shown in FIG. 13 is opened to 270° and is a front view.
Figure 18:
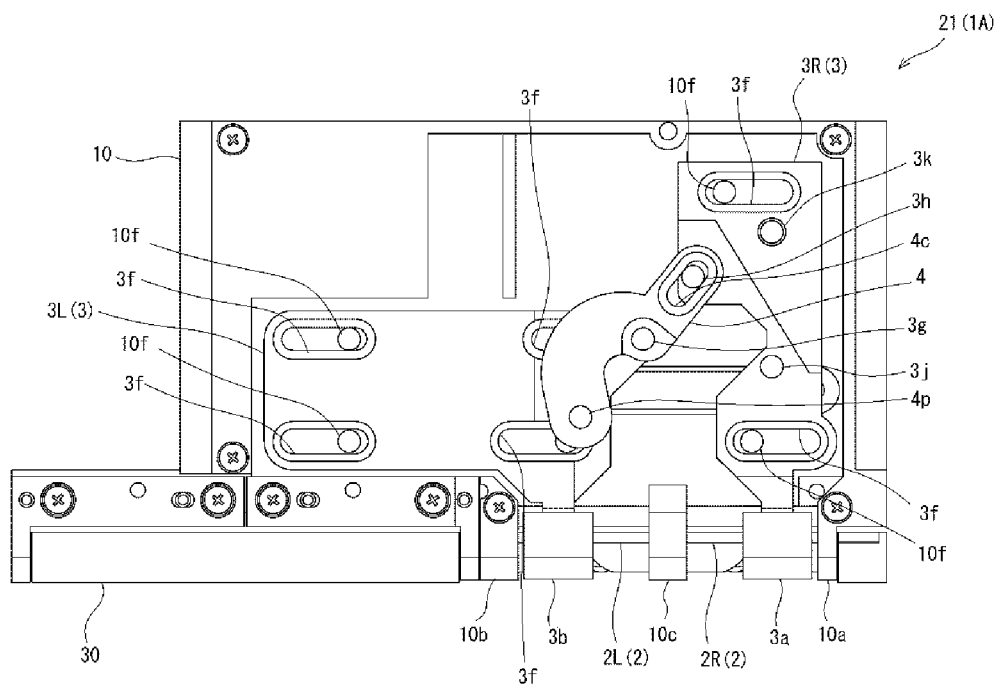
FIG. 18 is an explanatory diagram depicting the state of a rocking member in the state depicted in FIG. 15.

Given this, in the same manner as with the example described above, with the pair of linear motion members 3R and 3L, through rotation of the shaft 2 in one direction, the pair of linear motion members 3R and 3L will move toward each other, as depicted in FIG. 13 (FIG. 16), and when the shaft 2 is rotated in the opposite direction, the pair of linear motion members 3R and 3L will move apart from each other, as depicted in FIG. 15 (FIG. 18). At this time, each of the linear motion members 3R and 3L have elongated holes 3f that extend in the direction along the shaft 2, where these elongated holes 3f engage with guide protrusions 10f that are provided on the case 10, to guide the linear movement of the linear motion members 3R and 3L.

Figure 16:
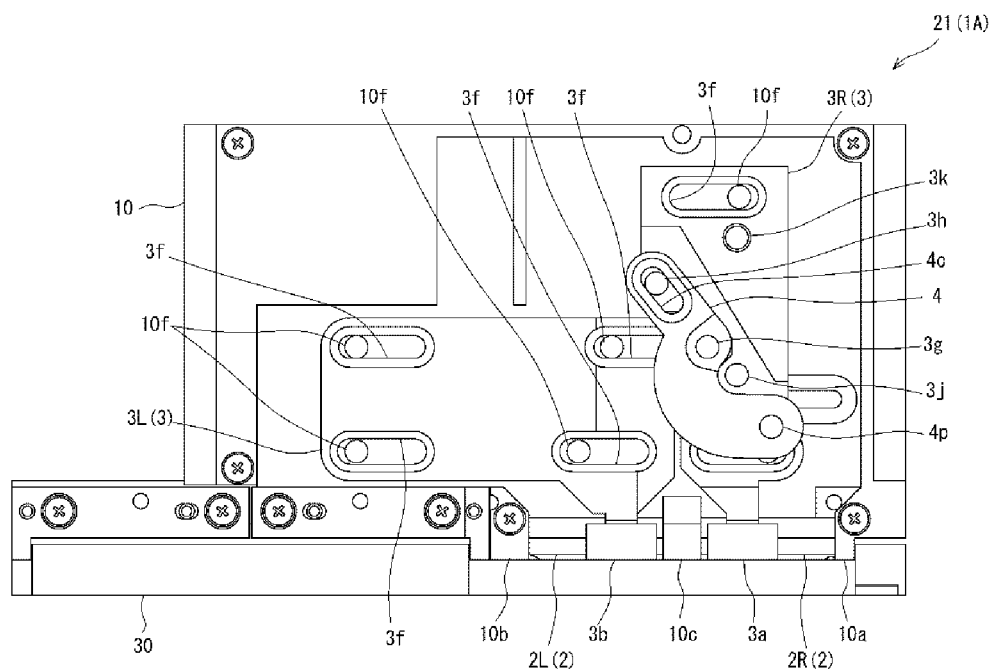
FIG. 16 is an explanatory diagram depicting the state of a rocking member in the state depicted in FIG. 13.
Figure 17:
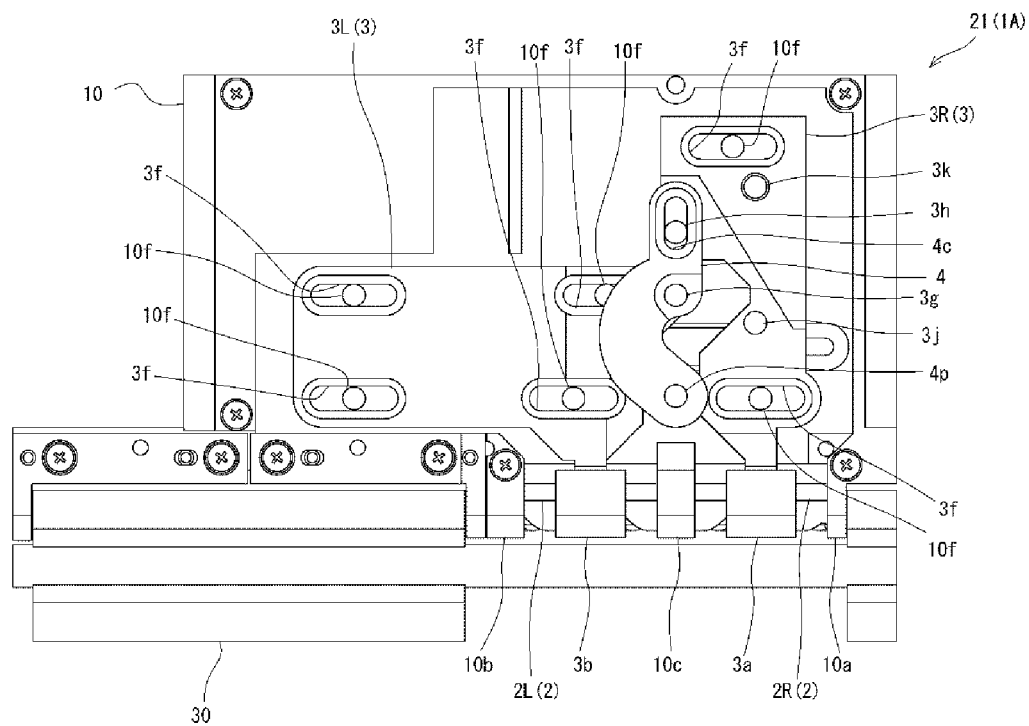
FIG. 17 is an explanatory diagram depicting the state of a rocking member in the state depicted in FIG. 14.

In contrast, as depicted in FIG. 16 through FIG. 18, the rocking member 4 is a lever member wherein the center portion is borne on a shaft protrusion 3g that is provided on one of the linear motion members 3L, with an elongated hole 4c for engaging a mating portion 3h of the other linear motion member 3R provided on one end side and a mating protrusion 4p provided on the other end side, serving as a mechanism that rocks around the shaft protrusion 3g, as depicted in FIG. 16 through FIG. 18, through the movement of the linear motion members 3R and 3L toward each other and away from each other along the shaft 2.

The moving member 5 is provided with a guide hole 5f of an elongated hole shape in a direction that crosses the shaft 2, where this guide hole 5f engages with two mating protrusions 3j and 3k that are provided on one of the linear motion members 3L. The mating protrusions 3j and 3k are provided in positions that are separated from each other in the direction that crosses the shaft 2, and the guide hole 5f engages the mating portions 3j and 3k, so that the moving member 5 will first move in a direction along the shaft 2 accompanying movement of the linear motion member 3R.

Additionally, the moving member 5 has a cam hole 5g, where a mating protrusion 4p of the rocking member 4 engages with the cam hole 5g. The cam hole 5g has a cam face that extends in the direction along the shaft 2, so as to correspond with the movement of the mating protrusion 4p along the shaft 2 when the rocking member 4 rocks. Additionally, the cam hole 5g has a cam face for moving the moving member 5 in a direction that crosses the shaft 2, using the movement of the mating protrusion 4p in a direction that crosses the shaft 2 when the rocking member 4 rocks.

With such a mechanism, when the case 10 is rotated in respect to the hinge frame 30, the shaft 2 rotates in respect to the case 10, and the pair of linear motion members 3R and 3L move along the shaft 2 so as to move toward each other or away from each other, where the rocking member 4 rocks around the shaft protrusion 3g through the movement of these linear motion members 3R and 3L. Additionally, through the cam hole 5g of the moving member 5 acting in respect to the rocking of the rocking member 4, the moving member 5 moves in a direction that crosses the shaft 2.

A coupling portion 5q is provided on the moving member 5, and a coupled portion W of an object that is to be moved is connected to this coupling portion Sq. As can be appreciated from the explanation above, the moving member 5 moves not only in the direction that crosses the shaft 2, but moves also in the direction along the shaft 2, following the movement of the linear motion member 3R, and thus the coupling portion 5q is provided with a releasing guide that releases the movement of the moving member 5 along the shaft 2, so as to convey, to the coupled portion W, only the movement that is perpendicular to the shaft 2.

As explained above, in the thrust converting mechanisms 1 and 1A according to embodiments according to the present invention, the provision of the linear motion members 3 (3R and 3L) that move toward each other or away from each other when rotation of the shaft 2 is converted into linear motion makes it possible to increase the amount of linear motion in respect to the limited rotation of the shaft 2, without increasing the driving force for rotating the shaft 2. Moreover, when structuring the hinge apparatuses 20 and 21, the connection of the displays, or the like, to moving members 5 that are provided for two cases 10 makes it possible to eliminate the gap, through moving the displays, or the like, in a direction that is perpendicular to the shaft 2, when the two cases 10 are opened up, without interference between the end portions of the two cases 10.

Such thrust converting mechanisms 1 and 1A and hinge apparatuses 20 and 21 can be used in a variety of applications.

While embodiments of the present invention were described in detail above in reference to the drawings, the specific structures are not limited to these embodiments, but rather design changes, and the like, within a range that does not deviate from the spirit and intent of the present invention are included. In addition, the various embodiments described above may be combined through using each other's technology insofar as there are no particular inconsistencies or problems in the purposes and structures thereof.

The invention claimed is:
1. A thrust converting mechanism, comprising:
   a shaft comprising a pair of helical mated portions, formed in mutually opposing directions;
   a pair of linear motion members comprising mating portions engaging, respectively, the pair of mated portions, wherein the pair of linear motion members is moveable relative to the shaft;
   a case supporting the pair of linear motion members so as to enable movement along the shaft, and further bearing the shaft rotatably;
   a rocking member borne on one of the linear motion members of the pair, and engaging with the other linear motion member of the pair, and rocking through relative motion of the shaft in respect to the case; and
   a moving member that engages with the rocking member to move, through rocking of the rocking member, in a direction that crosses the shaft.
2. The thrust converting mechanism as set forth in claim 1, comprising:
   a holding member holding two of the aforementioned shafts in parallel, wherein:
   a pair of cases, which bear the respective shafts rotatably, rotate around the shafts by at least 180°.
3. The thrust converting mechanism as set forth in claim 2, wherein:
   when the pair of cases is positioned in a plane, flat plate members that engage respectively with two aforementioned moving members are adjacent with no gap.
4. The thrust converting mechanism as set forth in claim 3, wherein:
   the flat plate member is a flat-panel display.
5. A hinge apparatus comprising the thrust converting mechanism as set forth in claim 1.
6. A mobile information terminal comprising the hinge apparatus as set forth in claim 5.
7. A bag, comprising a thrust converting mechanism as set forth in claim 1, wherein:
   the shaft is secured to a handle on which the main body of the bag is borne.
8. The thrust converting mechanism as set forth in claim 1, wherein each mating portion of the mating portions is configured to extend into a corresponding helical mated portion of the pair of helical mated portions.

* * * * *